United States Patent [19]

Nakayama et al.

[11] 4,098,930

[45] Jul. 4, 1978

[54] METHOD FOR PRODUCING MICROPOROUS SEPARATOR FOR ELECTROCHEMICAL CELL

[75] Inventors: Shiro Nakayama; Kuniyuki Nakayama; Ikuo Nakaya, all of Tokyo, Japan

[73] Assignee: The Fujikawa Cable Works, Ltd., Japan

[21] Appl. No.: 743,919

[22] Filed: Nov. 22, 1976

[30] Foreign Application Priority Data

Sep. 17, 1976 [JP] Japan ............................... 51-110753

[51] Int. Cl.² .......................... B05D 3/10; B05D 5/00
[52] U.S. Cl. ...................................... 427/246; 204/296
[58] Field of Search ................ 427/246, 244; 428/522, 428/317, 904; 204/296

[56] References Cited

U.S. PATENT DOCUMENTS

| | | | |
|---|---|---|---|
| 3,100,721 | 8/1963 | Holden | 427/246 |
| 3,450,650 | 6/1969 | Murata | 204/296 X |
| 3,492,154 | 1/1970 | Einstman | 427/246 |
| 3,527,653 | 9/1970 | Sommer et al. | 427/246 |
| 3,582,393 | 6/1971 | Skikada | 427/246 |
| 3,795,635 | 3/1974 | Marze et al. | 204/296 X |

*Primary Examiner*—Harry J. Gwinnell
*Assistant Examiner*—Evan K. Lawrence
*Attorney, Agent, or Firm*—McGlew and Tuttle

[57] ABSTRACT

A method for producing a microporous separator for an electrochemical cell comprises dissolving a copolymer of acrylonitrile into N,N-dimethylformamide, impregnating an acid- and/or alkali-resistant fibrous web with the resultant solution, and thereafter dipping the impregnated web into an aqueous coagulating bath, whereby the copolymer deposits on and between the web fibers to form a microporous matrix. The aqueous coagulating bath is selected from the group consisting of water at a temperature of 15° C or below and aqueous solutions of a water-soluble acid solute, basic solute, or netural solute at a concentration of one mol / 1 or above. This method yields products having low maximum pore radii and yet low electric resistances.

15 Claims, No Drawings

METHOD FOR PRODUCING MICROPOROUS SEPARATOR FOR ELECTROCHEMICAL CELL

BACKGROUND OF THE INVENTION

1. Field of the Invention

This invention relates to a process of making separators for an electrochemical cell. The principal object of this invention is to provide a process of making separators for an electrochemical cell of high quality, especially those having relatively uniform micropores and very low electrical resistance in electrolyte.

2. Description of the Prior Art

In general, the qualities requisite to a separator for electrochemical cell are that the separator inhibits any short-circuiting by a contact between electrodes having opposite polarities and yet permits electrode reaction-participating ions to pass freely; that the separator prevents minute particles, such as those of released electrode materials except ions, from migrating through; that the performance of the separator is not lowered by the electrode reactions, nor by chemicals employed in the cell; and that the separator gives no materials harmful to the cell.

Some of the prior separators for lead storage cell are made of wood. Some are produced by treating porous-made paper with a synthetic resin. Some are made by compounding silica gel into rubber. Some are produced by a process in which calcium carbonate powder is compounded into rubber and then the resultant compound is treated with hydrochloric acid to dissolve calcium carbonate. In addition, some of the separators of the prior art are made by sintering powdery polyvinyl chloride.

In the case of prior separators for a cell employing an alkaline electrolyte, nylon fabrics, cellophane etc. are employed.

Among these separators, those made of wood or by sintering powdery polyvinyl chloride have lower limits of thickness at a relatively high level and are not suitable where the space factor is of importance. Separators which have been made by adding a powdery inorganic material to rubber, by sintering polyvinyl chloride powder, or by employing nylon fabric have micropores having sizes varying over a wide range and are not satisfactory for preventing the migration of released electrode materials, even when the mean pore radius is controlled to be a lower value.

Separators produced by treating porous-made paper with a synthetic resin are not satisfactory with regard to their microporosity, and their mechanical strength is lowered due to sulfuric acid when employed in a lead storage cell. Separators made of polyvinyl chloride can generate chloride ions under the influence of electrode reactions, and electrode materials of a lead storage cell may lose weight.

Further, separators made from cellophane have low mechanical strengths. In short, the various separators of the prior art have several disadvantages along with several advantages, and are not satisfactory.

Generally speaking, both pore sizes and the electric resistance of a separator impregnated with electrolyte, which constitute the elementary characteristics of a separator for an electrochemical cell, depend upon the process of producing or making the separator. To select the starting material is important, especially when it is intended to make a separator which does not easily lose weight by electrolyte and electrode reactions and scarcely generates harmful materials. The mechanical strength and the thickness of the separator are determined by the kinds and the combination of the starting materials.

SUMMARY OF THE INVENTION

Thus, according to this invention, a novel separator is provided for an electrochemical cell composed of a microporous matrix which is made by employing a web of acid- and/or allkali-resistant fibers and a copolymer of acrylonitrile with a small amount of a comonomer having excellent heat and chemical resistance. Fundamentally, polyacrylonitrile and the like are suitable as starting materials, because they have excellent heat and chemical resistance, hardly lose weight by electrode reaction, and generate no harmful substances. However, the preparation of a microporous matrix from polyacrylonitrile or copolymers thereof has been considered as difficult.

The method for producing the separator includes impregnating the fibrous web with a solution comprising the copolymer of acrylonitrile and thereafter dipping the impregnated web into an aqueous coagulating bath.

DESCRIPTION OF THE PREFERRED EMBODIMENTS

As a result of extensive studies as to these difficulties, the present inventors succeeded in obtaining a novel matrix from a copolymer of acrylonitrile which is microporous and has a sufficiently low electric resistance when impregnated with electrolyte. This invention is accomplished on the basis of these studies.

According to the first embodiment of the present invention, there is provided a method for producing a separator for an electrochemical cell which is characterized by dissolving a copolymer of acrylonitrile with a small amount of a comonomer into N,N-dimethyl formamide to form a solution containing 4 to 12% by weight of said copolymer, applying said copolymer solution to a web or woven or nonwoven fabric to impregnate same, and thereafter dipping the resultant web in cold water, whereby said copolymer deposits on said web by coagulation.

The second embodiment of this invention provides a method for producing a separator for an electrochemical cell which is characterized by dissolving a copolymer of a acrylonitrile with a small amount of comonomer into N,N-dimethyl formamide, adding acetone to the resultant solution to form a solution containing 4 to 12% by weight of said copolymer, the amount of acetone added being 20 to 100 parts by weight per 100 parts by weight of N,N-dimethyl formamide employed, applying said copolymer solution containing acetone to a web of woven or nonwoven fabric to impregnate same, and thereafter dipping the resultant web in cold water, whereby said copolymer deposits on said web by coagulation.

The third embodiment of this invention provides a method for producing a separator for an electrochemical cell which is characterized by dissolving a copolymer of acrylonitrile with a small amount of comonomer into N,N-dimethyl formamide to form a solution containing 4 to 12% by weight of said copolymer, applying said copolymer solution to a web of woven or nonwoven fabric to impregnate same, and thereafter dipping the resultant web in an aqueous coagulating bath which contains an acidic, basic, or neutral solute at a concentration of one mole/l or more, whereby said copolymer deposits on said web by coagulation.

The fourth embodiment of this invention provides a method for producing a separator for an electrochemical cell which is characterized by dissolving a copolymer of a acrylonitrile with a small amount of comonomer into N,N-dimethyl formamide, adding acetone to the resultant solution to form a solution containing 4 to 12% by weight of said copolymer, the amount of acetone added being 20 to 100 parts by weight per 100 parts by weight of N,N-dimethyl formamide employed, applying said copolymer solution containing acetone to a web of woven or nonwoven fabric to impregnate same, and thereafter dipping the resultant web in an aqueous coagulating bath which contains an acidic, basic, or neutral solute at a concentration of one mole/l or more, whereby said copolymer deposits on said web by coagulation.

Other aspects and embodiments of the invention will become apparent from the following description.

The method for producing separators of this invention will be explained in detail in the following description. Employable resins of this invention include copolymers which are composed principally of acrylonitrile with a small amount of minor comonomer. Copolymers to be used in this invention should have a low content of the minor comonomer. Otherwise, the maximum pore radius of formed matrix exceeds disadvantageously the threshold value. Typical minor comonomers are vinyl chloride, acrylic acid, and acrylates.

One of these copolymers is dissolved in N,N-dimethyl formamide to form a solution containing 4 to 12% by weight of resin. The prepared solution is applied to a web to impregnate same. The pickup of impregnated web is adjusted to a predetermined value by means of a doctor knife or a nip between two rolls. The web used in the method of this invention may be a woven or nonwoven fabric which is made from acid- and/or alkali-resistant fiber, such as polyesters, polyamides, polypropylene, acrylics, and cellulose. Especially, when a thin separator is desired to be produced, a nonwoven fabric is employed.

In the case of the first and second embodiments of this invention, the impregnated web is dipped in cold water at a temperature of 15° C or below. Upon dipping, the resin solution becomes gradually unstable due to the solvent being with N,N-dimethyl formamide for water. The resin coagulates and deposits on and between all fibers and other materials of web to form a microporous matrix.

One essentially important point in the first and second embodiments of this invention consists in the fact that the cold water wherein the web is dipped must be maintained at a temperature of about 15° C or below. The lower the temperature of the cold water is, the smaller the maximum pore radius of the formed matrix is, provided that the electric resistance is roughly kept constant. As the temperature exceeds about 15° C the dersired performance of the formed matrix becomes hard to realize.

In the case of the third and fourth embodiments of this invention, the impregnated web is dipped in a coagulating bath consisting of an aqueous solution. To prepare a solution of the coagulating bath, one of the following water-soluble substances is employed as solute.

Acidic solutes: organic acids, mineral acids, and salts which become acidic in solution, e.g. formic acid, acetic acid, sulfuric acid, hydrochloric acid, nitric acid, ammonium sulfate and sodium bisulfate Basic solutes: alkali hydroxides, aqueous ammonia, salts which become basic in solution, and organic acid amides, e.g. sodium hydroxide and N,N-dimethyl formamide Neutral solutes: neutral salts and neutral organic substances, e.g. sodium chloride, sodium sulfate, sodium nitrate, ketones, lower alcohols, and polyhydric alcohols These solutes are employed at a concentration of one mole/l or more in the coagulating bath. In the selection of solute to be used, the purpose and the use of the separator must be considered.

When the impregnated web is dipped into a coagulating bath containing the solute specified above at ordinary temperature, the resin solution becomes gradually unstable due to the solvent being exchanged N,N-dimethyl formamide for water. The resin coagulates and deposits on and between all fibers and other materials of web to form a microporous matrix.

The maximum pore radius in resultant matrix of these embodiments depends upon the concentration of solute in the coagulating bath employed. Generally, desirable effects are obtained when the concentration of solute is one mole/l (in the case of dissociable solute, one mole of ions per liter) or higher. This dependency may relate to the osmotic pressure of the solution in the course of coagulation.

When the solute concentration is higher, the osmotic pressure of the solution is higher and the penetration of water into the coagulating resin is slower. Thus, the maximum pore radius is observed to be smaller. In the case of a strong base, such as sodium hydroxide, however, a high concentration of solute decomposes dimethyl formamide to form amine. Thus, the concentration of solute is preferably kept at 15% or below. Further, when an aqueous dimethyl formamide solution is employed, a higher concentration causes a redissolution of coagulated resin and the maximum pore radius tends to increase. The upper limit of the concentration in this case is of the order of about 60%.

Thus, a solution of a solute defined above can be employed as coagulating bath at ordinary temperature, in place of cold water. The results are excellent as well. However, when the temperature of the coagulating bath is too high, the desired effects cannot be obtained and, additionally, the process becomes too expensive.

The concentration of the resin in the solution for impregnating is preferably in the range of 4 to 12% by weight. If the concentration is smaller than these values, the maximum pore radius of formed matrix increases. When the concentration is larger than these values, the electric resistance of obtained matrix disadvantageously increases.

In accordance with the second and fourth embodiments of this invention, when it is desired to produce a resinous matrix having a maximum pore radius of 10μ or below along with a low electric resistance, a resin solution as specified above is added with acetone in an amount of 20 to 100 parts by weight per 100 parts by weight of N,N-dimethyl formamide. A fabric is impregnated with the resultant solution of resin in mixed solvent and the pickup is adjusted to a predetermined amount. Thereafter, the impregnated web is dipped into an aqueous coagulating bath of this invention, that is, a cold water bath at a temperature of about 15° C or below, or an aqueous solution of a solute specified above at a concentration of one mole/l or above. As acetone has a small molecular weight, the solvent is rapidly exchanged acetone for water, in a coagulating bath comprising cold water, or on aqueous solution containing a solute specified above. As a result, a great number of micropores having relatively uniform sizes are formed and the maximum size of formed micropores is of markedly small. Consequently, the obtained matrix has a low electric resistance when dipped in an electrolyte.

If the amount of acetone added is smaller than 20 parts by weight per 100 parts by weight of N,N-dimethyl formamide, the maximum pore radius becomes larger. If larger than 100 parts by weight, the resin solution in mixed solvent becomes unstable and is hardly operable.

Also in the case of a copolymer solution in a mixed solvent having been employed as impregnating solution, cold water as coagulating bath must be maintained at a temperature of about 15° C or below. If the temprature of water exceeds about 15° C, the maximum pore radius of formed matrix is large and the electric resistance thereof is high.

The copolymer concentration in mixed solvent according to this invention is preferably 5% by weight or above. If the concentration is below 4% by weight, the formed matrix has a maximum pore radius which is too large, and the amount of fixed copolymer lowers.

In general, the requisite of a separator for electrochemical cell is that an electrolyte must easily penetrate into the matrix of the separator. As the common materials for separator, other than cellophane and paper from cellulosic fibers, are water repellent and not hydrophilic, it is common practice that a surface-active agent is added to the materials to improve their capability to be impregnated. It is also within the scope of this invention that a required amount of a surface-active agent is added to a resin solution of this invention to improve the capability to be impregnated, if necessary.

Certain preferred embodiments of the invention are illustrated by the following non-limiting examples.

EXAMPLE 1

A copolymer of acrylonitrile with a minor comonomer of 5% or below (trade name "Exlan"*) is dissolved in N,N-dimethyl formamide to form a 6 wt. % solution. This copolymer solution is applied to a nonwoven fabric of polyester fiber (thickness of 0.23 mm, weight of 75.9g/m$^2$) to give a pickup of about 200g/m$^2$. Then, the treated fabric is dipped in cold water as aqueous coagulating bath whereby the resin coagulates and deposits on the fabric. The resultant fabric is washed with water and dried to obtain a separator.

Exlan is a copolymer fiber having acrylonitrile as the principal consituent, manufactured by Nippon Exlan Industries Co., Japan.

The temperature of the cold water as aqueous coagulating bath is varied over a wide range. The maximum pore radii and the electric resistances at 20° C of obtained separators when dipped in a sulfuric acid solution having a specific gravity of 1.30 as electrolyte, are determined. The results are shown in Table 1.

Table 1

| Temperature of water (° C) | Electric resistance* | Maximum pore radius ($\mu$) |
|---|---|---|
| Products of this invention | | |

Table 1-continued

| Temperature of water (° C) | Electric resistance* | Maximum pore radius ($\mu$) |
|---|---|---|
| 5 | 4.6/10$^4$ | 10 |
| 10 | 5.6/10$^4$ | 12 |
| 15 | 7.1/10$^4$ | 14 |
| Controls | | |
| 20 | 9.3/10$^4$ | 21 |
| 30 | 11.2/10$^4$ | 23 |
| Prior paper separators | | |
| | 12–30/10$^4$ | 20–23 |

Note
*Electric resistances are determined by JIS C 2313 and are expressed in units of $\Omega$ . dm$^2$/sheet.

As the requisite of a separator for an electrochemical cell is that the maximum pore radius of micropores is small and the electric resistance is low, it can be seen from Table 1 that products of this invention are excellent.

EXAMPLE 2

Another copolymer of acrylonitrile with a minor comonomer of 5% or below (trade name "Toraylon"*) is dissolved in N,N-dimethyl formamide to form solutions of various concentrations of copolymer. Each copolymer solution is applied to a respective nonwoven fabric of polyester fiber of the same kind as in Example 1 to give each a pickup of about 250g/m$^2$. Each matrix is formed in a cold water of which the temperature is adjusted to 12° C. Each of the separators has a thickness within a range of 200 to 230$\mu$. The properties are determined as shown by Table 2.

*Toraylon is a copolymer fiber produced from copolymers of acrylonitrile with a small amount of another comonomer, manufactured by Toray Company, Japan.

Table 2

| Concentration of resin, wt% | 2.0 | 4.0 | 6.0 | 8.0 | 12.0 | 15.0 |
|---|---|---|---|---|---|---|
| Electric resistance $\Omega$. dm$^2$/ sheet | 5.2/10$^4$ | 6.3/10$^4$ | 7.12/10$^4$ | 9.1/10$^4$ | 9.8/10$^4$ | 23/10$^4$ |
| Max. pore radius, $\mu$ | 50 | 20 | 14 | 10 | 8 | 6 |

As can be seen from the results shown in Table 2, the resin concentration is preferably maintained at 12% by weight or below in order to obtain a separator having an electric resistance of 10/10$^4$ $\Omega$.dm$^2$/sheet or below. To obtain a maximum pore radius of 20$\mu$ or below, the resin concentration must be at 4% by weight or above.

EXAMPLE 3

A copolymer of acrylonitrile with a minor comonomer of 5% or below (trade name "Exlan") is dissolved in N,N-dimethyl formamide. Five portions of the obtained copolymer solution are added, while stirring, with 0, 10, 20, 60 and 100 parts by weight of acetone per 100 parts by weight of N,N-dimethyl formamide, respectively. The resin concentration of each portion is adjusted to 8% by weight. When more than 100 parts by weight of acetone is added, the resin solution becomes turbid and heterogeneous, and cannot be employed. Five nonwoven fabrics of polyester, each being 230$\mu$ in thickness and weighing 75g/m$^2$, are impregnated with the five said portions of resin solution in mixed solution, respectively. The impregnated fabrics are sqeeuezed by rolls to give each a pickup of 300 g/m$^2$, and then are dipped in cold water at about 12° C, whereby the resin coagulates to deposit. When the resulted products are rinsed with water and dried, separators comprising microporous matrix of copolymer of acrylonitrile are obtained.

The maximum pore radii and the electric resistances at 20° C of obtained separatores, when dipped in a sulfuric acid solution having a specific gravity of 1.30 as electrolyte, are determined. The results are as shown by Table 3.

Table 3

| Amount added of acetone (part by weight) | Electric resistance ($\Omega \cdot dm^2$/sheet) | Maximum pore radius ($\mu$) |
|---|---|---|
| Controls | | |
| 0 | $9.1/10^4$ | 10.4 |
| 10 | $9.6/10^4$ | 9.3 |
| Products of this invention | | |
| 20 | $6.9/10^4$ | 5.2 |
| 60 | $8.0/10^4$ | 2.5 |
| 100 | $8.3/10^4$ | 1.8 |

As can be seen from the results shown in Table 3, it turned out that added acetone in an amount of 20 parts by weight or more brings about micropores of remarkably small radius, while the electric resistance does not increase.

EXAMPLE 4

With the same substances and procedures as in Example 3, a resin solution containing 8% by weight of copolymer and 60 parts by weight of added acetone in N,N-dimethyl formamide is prepared. Nonwoven fabrics of polyester (each being 230$\mu$ in thickness and weighing 75 g/m$^2$) are impregnated with the resin solution above and thereafter are squeezed by means of rolls to give each a pickup of 200 g/m$^2$. The impregnated fabrics are soaked in coagulating baths of water which are maintained at various temperatures. The characteristics of obtained separators are as shown by Table 4.

Table 4

| Temperature of water (° C) | Electric resistance ($\Omega \cdot dm^2$/sheet) | Maximum pore radius ($\mu$) |
|---|---|---|
| Product of this invention | | |
| 5 | $7.7/10^4$ | 1.6 |
| 10 | $7.5/10^4$ | 1.8 |
| 15 | $8.0/10^4$ | 2.5 |
| Controls | | |
| 20 | $10.3/10^4$ | 9.8 |
| 30 | $15/10^4$ | 13.2 |

It is found in Table 4 that, as the temperature of water of coagulating bath rises through 15° C, the maximum pore radius tends to increase rapidly. Especially when the temperature exceeds 20° C, this tendency becomes remarkable. In addition, the electric resistance also increases. These findings would relate to the fact that acetone has a low boiling point.

EXAMPLE 5

A copolymer of acrylonitrile with a minor comonomer of 5% or below (trade name "Exlan") is dissolved in N,N-dimethyl formamide to prepare solutions of various concentrations. Each of them is added with 60 parts by weight of acetone. Nonwoven fabrics of polyester (each having a thickness of 230$\mu$ and weighing 75 g/m$^2$) are impregnated with the copolymer solutions of various concentrations, respectively. Each impregnated fabrics is squeezed to give a pickup of 200 g/m$^2$ by rolls. Thereafter, the resulted fabrics are soaked in a water at about 12° C, whereby the resin coagulates to deposit on fabrics. Then, the thus-treated fabrics are washed with water and dried to obtain separators for electrochemical cell.

The characteristics of the products are as shown in Table 5.

Table 5

| Concentration of resin (wt %) | Electric resistance ($\Omega \cdot$ dm/sheet) | Maximum pore radius ($\mu$) |
|---|---|---|
| Control | | |
| 3 | $1.2/10^4$ | 50 |
| Products of this invention | | |
| 5 | $4.8/10^4$ | 8.3 |
| 8 | $8.0/10^4$ | 2.5 |
| 10 | $8.5/10^4$ | 1.8 |
| Control | | |
| 12 | $13/10^4$ | 1.2 |

From the results shown in Table 5, it turns out that, when acetone is added in accordance with this invention, a resin concentration in the range of 5 to 10% by weight gives the best results so that the maximum pore radius is of 10$\mu$ or below and yet the electric resistance is low.

EXAMPLE 6

A copolymer of acrylonitrile with a minor comonomer of 5% or below (trade name "Exlan") is dissolved in N,N-dimethyl formamide to form a 6 wt. % solution. Nonwoven fabrics of polyester fiber (having a thickness of 0.23 mm and a weight of 75.9 g/m$^2$) are impregnated with this resin solution to give each a pickup of about 200 g/m$^2$. Various aqueous coagulating baths shown in Table 6 below are prepared. Each of the impregnated fabrics is dipped into its respective bath at 20° C, whereby the resin coagulates and deposits. Then, the dipped fabrics are rinsed with water and dried to obtain the separators. As a control, the same procedures are performed, except that pure water at ordinary temperature is employed as the coagulating bath. The results are shown in Table 6.

Table 6

| Aqueous coagulating bath | water | Solute | | | | | |
|---|---|---|---|---|---|---|---|
| | | $H_2SO_4$ | $(NH_4)_2SO_4$ | NaOH | DMF* | NaCl | acetone |
| Property of bath solution | — | acidic | acidic | basic | weakly basic | neutral | neutral |
| Concentration of solution, mole/l | — | 3 | 2 | 1 | 1.5 | 2 | 2 |
| Maximum pore radius of the product, $\mu$ | 21 | 7.8 | 4.5 | 4.8 | 5.2 | 6.4 | 5.0 |

*DMF : abbreviation of N,N-dimethyl formamide

Although some differences with regard to the maximum pore radius can be observed, depending on the kind of solute, all the solutions bring about smaller maximum pore sizes, compared with that of the product with pure water at ordinary temperature. It is ascertained that lowering of the temperatures of these solutions are not required when they are used as the aqueous coagulating bath.

EXAMPLE 7

The copolymer employed in Example 6 is dissolved in N,N-dimethyl formamide. Thereto is added 60 parts by weight of acetone per 100 parts by weight of N,N-dimethyl formamide to form a solution containing 8% by weight of said copolymer. The thus obtained solution is applied to nonwoven fabrics of polyester fiber (having a thickness of 0.23 mm and weighing 75 g/m$^2$) to give each a pickup of about 200 g/m$^2$. The impregnated fabrics are soaked in various aqueous coagulating baths to coagulate the resin. The resultant fabrics are rinsed with water and dried to obtain the separators. The characteristics of the products are shown in Table 7, together with those of the product treated by water at ordinary temperature as a control.

Table 7

| Aqueous coagulating bath | | Solute | | | | | |
|---|---|---|---|---|---|---|---|
| | water | H$_2$SO$_4$ | (NH$_4$)$_2$SO$_4$ | NaOH | DMF* | NaCl | acetone |
| Property of bath solution | — | acidic | acidic | basic | weakly basic | neutral | neutral |
| Concentration of solution, mole/l | — | 3 | 2 | 1 | 1.5 | 2 | 2 |
| Maximum pore radius of the product, μ | 12.3 | 6.6 | 3.8 | 4.0 | 3.8 | 5.5 | 3.4 |

*DMF : abbreviation of N,N-dimethyl formamide

Although some differences with regard to the maximum pore radius can be observed, depending on the kind of solute, all solutions give smaller maximum pore sizes, when compared with that of the product obtained by pure water at ordinary temperature. It is also observed that the temperature of these aqueous coagulating baths can be above ordinary temperature. As explained in detail above a separator for an electrochemical cell employable in industrial practice, which has a small maximum pore radius and a satisfactorily low electric resistance when impregnated with an electrolyte, can be produced in accordance with this invention. Especially, by virtue of employing a solution of a specified solute as a coagulating bath, the separator can be produced without controlling the temperature of the bath below room temperature.

What is claimed is:

1. A method for making a micorporous separator for an electrochemical cell which comprises dissolving a copolymer of acrylonitrile with a small amount of comonomer into N,N-dimethyl formamide to form a solution consisting of 4 to 12% by weight of said copolymer and the balance N,N-dimethylformamide; applying the resultant copolymer solution to a fibrous web to impregnate said web with said solution, said web being resistant to acids, alkalis or both; and thereafter dipping the resultant impregnated web in an aqueous coagulating bath selected from the group consisting of water at a temperature of 15° C or below and aqueous solutions of a water-soluble acidic solute, basic solute, or neutral solute at a concentration of one mole/l or above, wherein if said basic solute is a strong base, said concentration is no greater than 15%, and if said basic solute is N,N-dimethylformamide, said concentration is no greater than about 60%; whereby said copolymer deposits on and between the fibers of said web by coagulation to form at microporous matrix.

2. A method according to claim 1, wherein said aqueous coagulating bath consists of water at a temperature of 15° C or below.

3. A method according to claim 1, wherein said acidic solute is selected from the group consisting of organic acids, mineral acids and salts which become acidic in solution.

4. A method according to claim 1, wherein said basic solute is selected from the group consisting of alkali hydroxides, ammonia water, salts which become basic in solution, and organic acid amides.

5. A method according to claim 1, wherein said strong base is NaOH.

6. A method according to claim 1, wherein said neutral solute is selected from the group consisting of neutral salts and neutral organic substances.

7. A method according to claim 1, wherein said web is nonwoven fabric which is made from a polymeric substance selected from the group consisting of polyesters, polypropylene, acrylics, polyamides and cellulose.

8. A method according to claim 1, wherein said web is a woven fabric which is made from a polymeric substance selected from the group consisting of polyamides, polyesters, polypropylene, acrylics and cellulose.

9. A method of making a microporous separator for an electrochemical cell which comprises dissolving a copolymer of acrylonitrile with a small amount of comonomer into N-N-dimethylformamide and adding acetone in an amount of 20 to 100 parts by weight per 100 parts by weight of N-N-dimethylformamide to form a solution consisting of 4 to 12% by weight of said copolymer and the balance acetone-N-N,-dimethylformamide mixed solvent; applying the resultant copolymer solution to a fibrous web to impregnate said web with said solution, said web being resistant to acids, alkalies, or both, and thereafter dipping the resultant impregnated web in an aqueous coagulating bath selected from the group consisting of water at a temperature 15° C or below and aqueous solutions of a water-soluble acidic solute, basic solute, or neutral solute at a concentration of one mole/l or above, wherein if said basic solute is a strong base, said concentration is no greater than 15%, and if said basic solute is N,-N-dimethylformamide, said concentration is no greater than about 60%, whereby said copolymer deposits on and between the fibers of said web to form an microporous matrix.

10. A method according to claim 9, wherein said acidic solute is selected from the group consisting of organic acids, mineral acids and salts which become acidic in solution.

11. A method according to claim 9, wherein said basic solute is selected from the group consisting of alkali hydroxides, ammonia water, salts which become basic in solution, and organic acid amides.

12. A method according to claim 9, wherein said strong base is NaOH.

13. A method according to claim 9, wherein said neutral solute is selected from the group consisting of neutral salts and neutral organic substances.

14. A method according to claim 9, wherein said web is a nonwoven fabric which is made from a polymeric substance selected from the group consisting of polyesters, polypropylene, acrylics, polyamides and cellulose.

15. A method according to claim 9, wherein said web is a woven fabric which is made from a polymeric substance selected from the group consisting of polyamides, polyesters, polypropylene, acrylics and cellulose.

* * * * *